United States Patent [19]

Kopp

[11] Patent Number: 4,616,990
[45] Date of Patent: Oct. 14, 1986

[54] VARIABLE PISTON ARRANGMENT FOR ROLL AND BREAD DIVIDING AND SHAPING MACHINE

[75] Inventor: Walter Kopp, Carteret, N.J.

[73] Assignee: Adam Equipment Corp., Eatontown, N.J.

[21] Appl. No.: 721,874

[22] Filed: Apr. 10, 1985

[51] Int. Cl.⁴ .................................................. A21C 5/02
[52] U.S. Cl. ..................................... 425/239; 425/256
[58] Field of Search ................... 99/353; 425/238, 239, 425/256

[56] References Cited

U.S. PATENT DOCUMENTS

| | | | |
|---|---|---|---|
| 934,417 | 9/1909 | Overkamp | 425/239 |
| 1,763,345 | 6/1930 | Devlin | 425/238 |
| 1,826,031 | 10/1931 | Streich | 425/238 |
| 3,485,187 | 12/1969 | Benier | 425/238 |

FOREIGN PATENT DOCUMENTS

| | | | |
|---|---|---|---|
| 1264362 | 8/1967 | Fed. Rep. of Germany | 425/239 |
| 1502504 | 10/1967 | France | 425/239 |

*Primary Examiner*—Billy J. Wilhite

[57] ABSTRACT

A variable piston arrangement is provided which is especially adapted for use in roll and bread dividing and shaping machines and includes one or more separate pistons each selectively and operably arranged in a single piston-housing used to size and shape baking dough to predetermined specifications. The piston-housing itself is disposed in a separate housing and as such may function as a separate piston in the following manner. Each of the separate pistons and piston-housing are arranged and controlled so that at least partial removal or withdrawal of one or more of the separate pistons from the piston-housing or withdrawal of the piston-housing from the separate housing will produce a predetermined vacated area or space which conforms to the size and shape of the rolls or bread to be baked. The predetermined area vacated by the one or more separate pistons or piston-housing may be varied in size and shape, as desired, so that a single variable piston arrangement may take the place of multiple piston-housing arrangements required in operating conventional roll and bread dividing and shaping machines used in dividing and shaping rolls and breads of different sizes and shapes.

16 Claims, 16 Drawing Figures

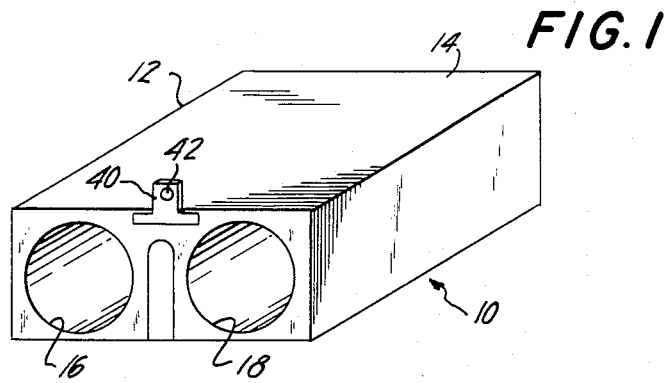
FIG.1
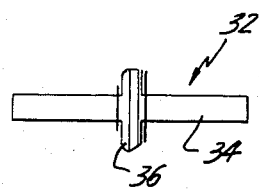
FIG.7
FIG.2
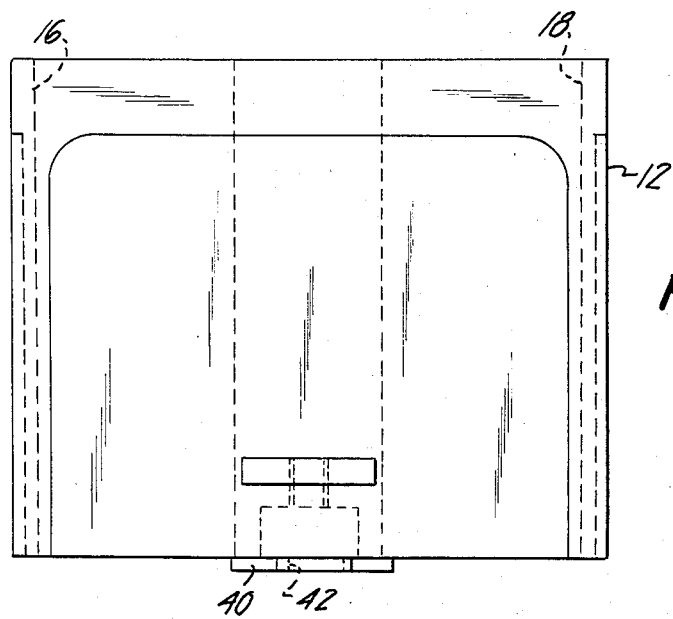
FIG.3
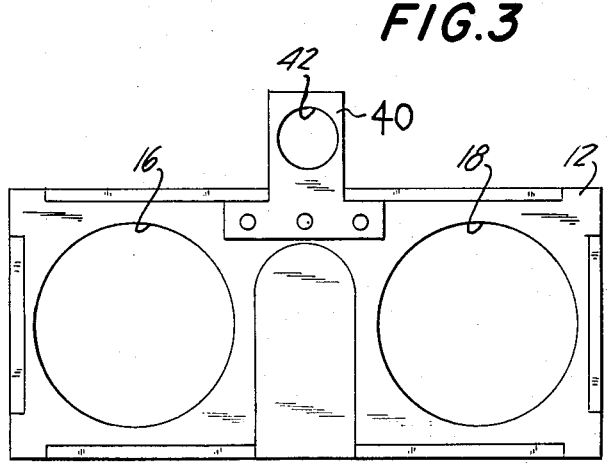
FIG.4
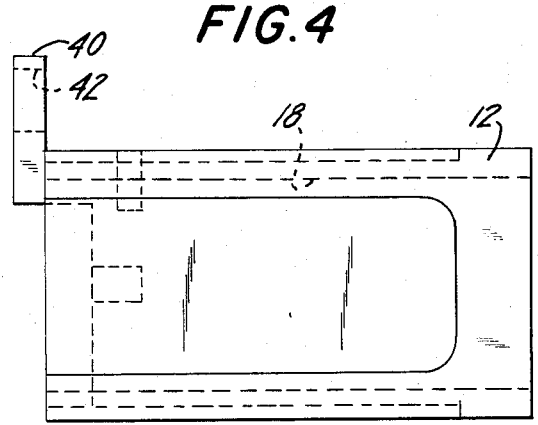

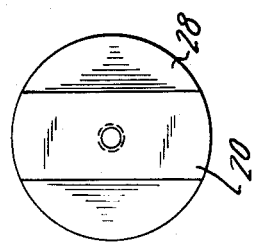
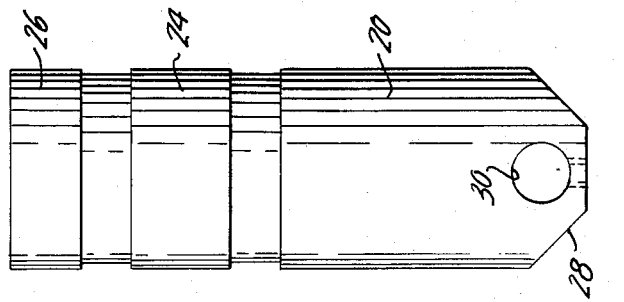
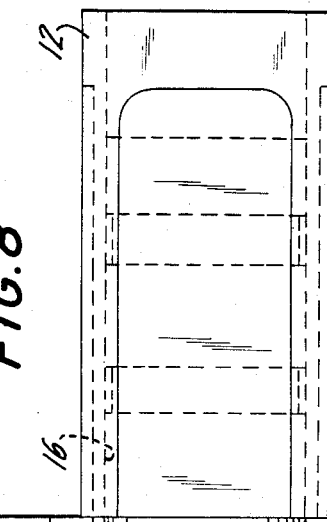
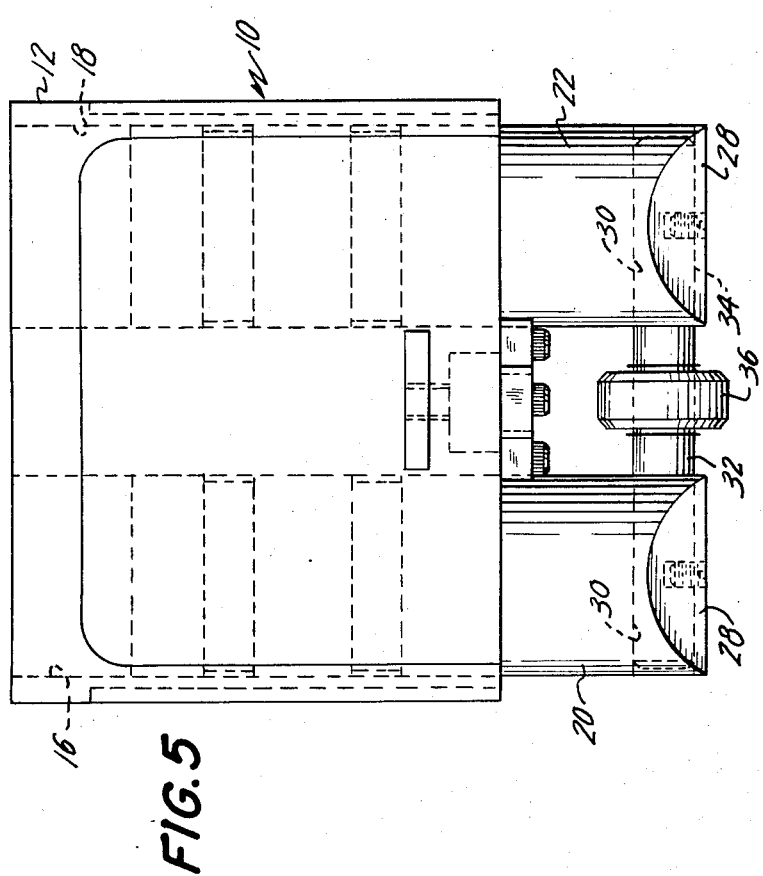
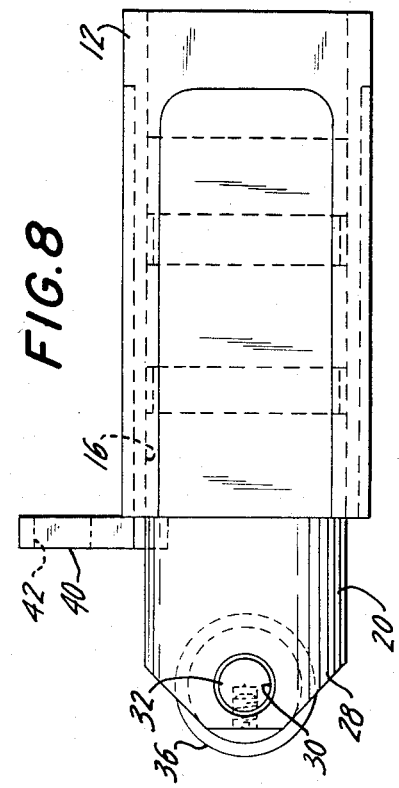
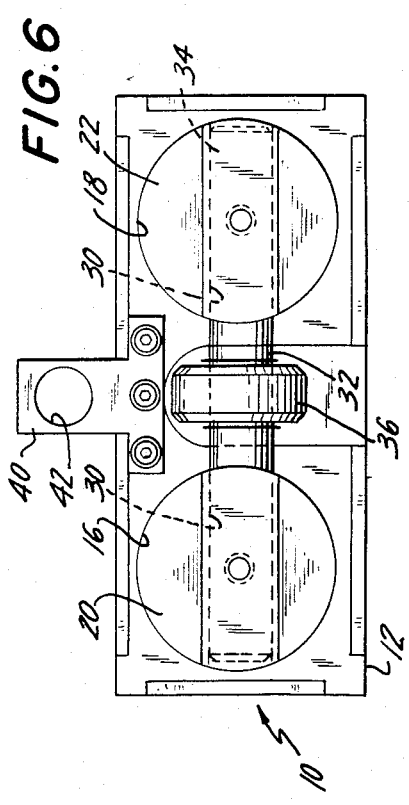

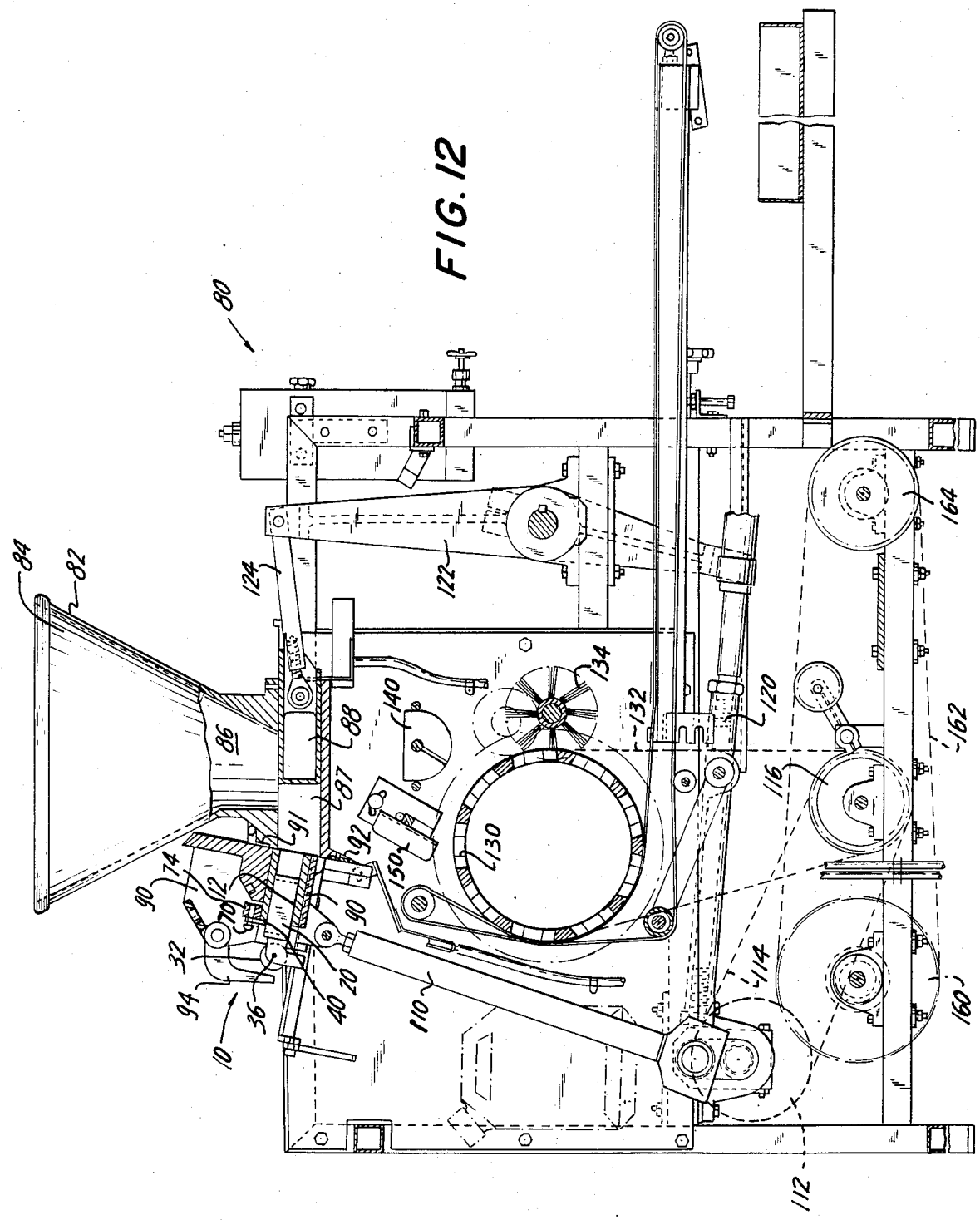

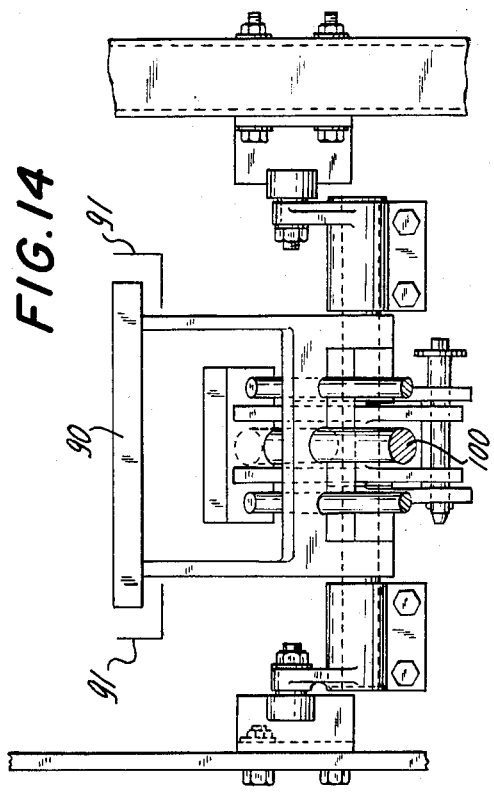
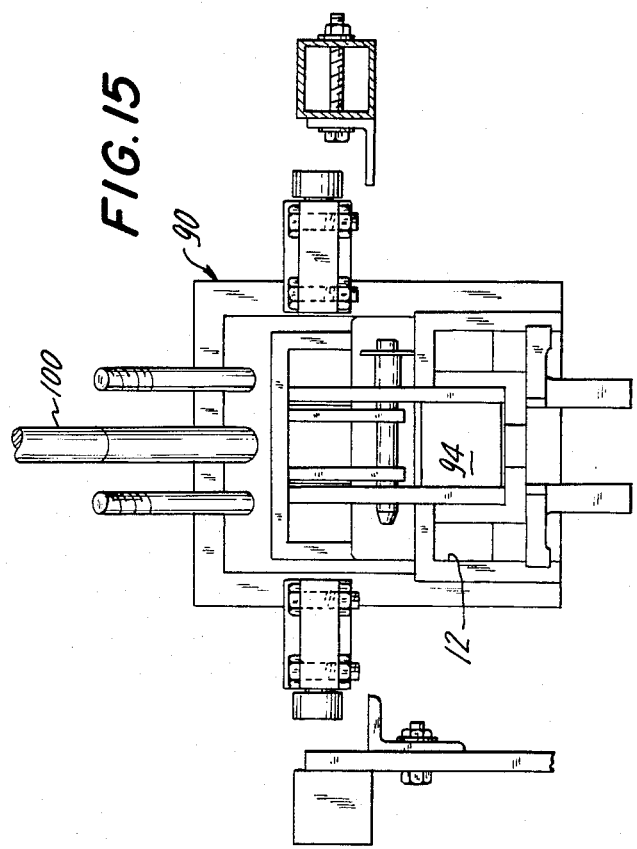
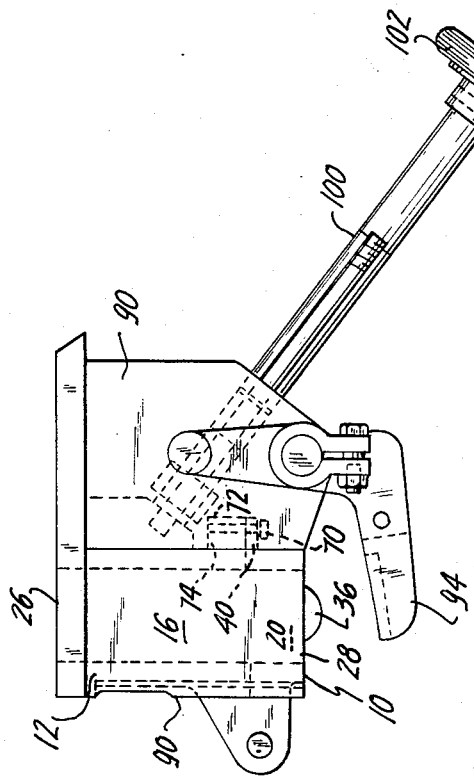
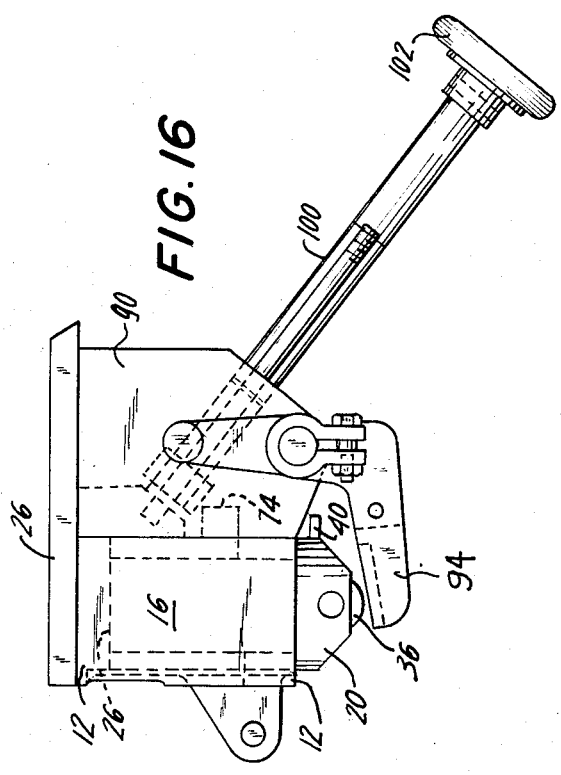

VARIABLE PISTON ARRANGMENT FOR ROLL AND BREAD DIVIDING AND SHAPING MACHINE

FIELD OF THE INVENTION

The present invention relates to a housing-piston arrangement especially adapted for use in roll and bread dividing and shaping machines which arrangement includes one or more controllable pistons and associated housing, which housing itself may serve as a piston, for use in sizing and shaping rolls and breads of various weights.

BACKGROUND OF THE INVENTION

Conventional roll and bread dividing and shaping machines for making rolls and breads include means for sizing and shaping baking dough to ultimately provide rolls and/or bread of desired predetermined size and weight. This has generally been accomplished through the use of a piston-housing arrangement wherein one or more pistons, each fixed in size and operating mode, are used in conjunction with the housing to provide predeterminedly sized and shaped areas, within the housing, for receiving and forming pieces of dough of desired size, weight and shape. Such a machine is quite efficient and requires only a single piston-housing arrangement if only rolls or breads of a single predetermined size, shape and weight are desired. However, if a variety of different types of rolls and breads of different sizes, shapes and weight are required, then, in such case, it is necessary to substantially provide a corresponding number of different piston-housing arrangements for each size, shape and weight of each roll and bread desired for each roll and bread dividing and shaping machine. Inasmuch as each piston-housing arrangement is quite expensive, conventional roll and bread dividing and shaping machines are usually purchased with one piston-housing arrangement, and possibly one spare to enhance versatility of the machine.

To overcome the above shortcomings associated with conventional roll and bread dividing and shaping machines, it has been suggested to employ a piston-housing arrangement wherein spaced apart fixed pistons of different sizes, each fixed in size, degree of movement and operating mode, are employed so that a single housing could produce more than one size roll or bread at the same time. This, indeed, has been a well-received advance. However, unfortunately, it still lacks the versatility and flexibility to produce many different types, sizes, shapes and weights of rolls and breads. Once such an arrangement of pistons has been fixed in the housing, the size and position of the piston and its degree of movement within the housing is fixed and cannot be altered. Thus, to provide the necessary operating range for making many different rolls and breads, as in the past, two or more of such multiple piston-housing arrangements will be required for each roll and bread dividing and shaping machine.

U.S. Pat. Nos. 934,417 to Overkamp, 1,763,345 to Devlin and 1,826,031 to Streich disclose various means for adjusting dough divider machines so that desired size pieces of dough may be produced. In the case of the Devlin and Streich patents, the mechanisms disclosed are cumbersome and impractical for commercial application. In the case of all three of the above patents, the machines disclosed are not adapted to make both roll pieces and bread pieces.

BRIEF DESCRIPTION OF THE INVENTION

In accordance with the present invention, a variable housing-piston arrangement is provided which is especially adapted for use with roll and bread dividing and shaping machines and overcomes the disadvantages associated with prior art roll and bread dividing and shaping machines which are not capable of producing breads and rolls or employ conventional fixed piston-housing arrangements or cumbersome and impractical adjustable piston-housing arrangements. Thus, a single variable housing-piston arrangement in accordance with the present invention may be employed in conjunction with conventional roll and bread dividing and shaping machines to make a wide variety of different rolls and breads of varying size, shape and weight, for example, from 1 ounce to 20 ounce pieces, thereby substantially increasing flexibility and versatility of such dividing and shaping machines while substantially reducing the cost thereof.

The variable housing-piston arrangement of the invention is especially adapted for use in conjunction with a roll and bread dividing and shaping machine and includes a piston-housing which includes an open internal area adapted to receive baking dough, the piston-housing itself being adapted to function as a piston within a separate housing adapted to receive dough, and the piston-housing being also adapted to receive at least one and preferably two or more, separate and independently operable pistons within its open internal area; one or more separate pistons disposed in the open internal area of the piston-housing, each of the separate pistons being adapted to be fixed in position or be made to move, together or independently of each other within the open internal area of the piston-housing; and piston control means for independently controlling operation and movement of the separate pistons within the internal area of the piston-housing and controlling movement of the piston-housing itself relative to a separate housing. In operation, fixing the position of the piston-housing relative to the separate housing by means of the piston control means, and withdrawing a portion of any one or more of the separate pistons a predetermined distance out from the open internal area of the piston-housing leaves a predetermined vacated area in the piston-housing for receiving baking dough which area conforms in size and shape to the desired size and shape of the roll or small bread to be baked. Alternatively, the piston control means may be activated to unlock the piston-housing so that it may move relative to a separate housing (whereupon the separate pistons will remain in position in the piston-housing); and in this case, withdrawal of the piston-housing a predetermined distance out from the separate housing leaves a predetermined vacated area in the separate housing for receiving dough which area conforms in size and shape to the desired size and shape of a bread to be baked.

The piston control means will be in communication with the separate pistons for limiting the actual distance that a portion of each of the separate pistons may be pushed out of the internal open area of the piston-housing. Alternatively, the piston control means will be in communication with the piston-housing (when unlocked to move) for limiting the actual distance that the piston-housing may be pushed out of the separate housing.

The piston control means, mentioned above, will also include selectively controllable locking means for fixing the position of the piston-housing so that it cannot be pushed out from the separate housing and thus will not provide an open area for receiving dough while the separate pistons are pushed out from the piston-housing itself to provide an open area within the piston-housing for receiving dough.

In addition, in accordance with the present invention, a roll and bread dividing and shaping machine for dividing and shaping rolls and breads is provided which includes a piston-housing arrangement as described above. The roll and bread dividing and shaping machine of the invention will include dough feeder means; the housing-piston arrangement described above in communication with the dough feeder means so that the dough feeder means may feed dough into the open internal area of the piston-housing and thereby cause one or more of the separate pistons to be pushed out from the piston-housing to leave a vacated space conforming to the size and shape of the roll or bread to be baked; a separate housing including a separate open internal area in communication with the piston-housing, the piston-housing, when not fixed in position, being adapted to function as a piston and slide within and be pushed out from the separate housing to leave a vacated space conforming to the size and shape of the bread to be baked which vacated space is in communication with the dough feeder means; piston control means for controlling and limiting the distance that the separate pistons or piston-housing may be moved by the advancing dough; knife means to cut dough seated in the piston-housing or separate housing from the remaining dough; means for forcing the separate pistons back into the piston-housing or for forcing the piston-housing back into the separate housing thereby pushing sized and shaped dough out from the piston-housing or separate-housing.

BRIEF DESCRIPTION OF THE FIGURES

FIG. 1 is a perspective view of the piston-housing employed in the housing-piston arrangement of the invention;

FIG. 2 is a top view of the housing shown in FIG. 1 including a plurality of separate pistons deployed in the housing;

FIG. 3 is a front view of the piston-housing shown in FIGS. 1 and 2 showing a portion of the piston control means;

FIG. 4 is a side view of the piston-housing shown in the previous Figures, with the top removed so that the open internal area thereof is exposed;

FIG. 5 is a top view of the piston-housing shown in FIG. 1 with the separate pistons partially withdrawn from the piston-housing;

FIG. 6 is a front view of the housing-piston arrangement shown in the previous Figures;

FIG. 7 is a front view of a portion of the piston control means employed in FIG. 5;

FIG. 8 is a side view of the piston-housing and separate piston partially extending therefrom, shown in FIGS. 5 and 6;

FIG. 9 is a side elevation of a separate piston used in the housing-piston arrangement of the invention;

FIG. 10 is a top view of the separate piston shown in FIG. 9;

FIG. 11 is an end view of the piston shown in FIGS. 9 and 10;

FIG. 12 is a side elevational view in section of a roll and bread dividing and shaping machine employing the housing-piston arrangement of the invention;

FIG. 13 is a view of piston control means employed in the roll and bread dividing and shaping machine shown in FIG. 12;

FIGS. 14 and 15 are top and end views, respectively, of apparatus employed to move the housing-piston arrangement in relation to the feeder means during operation of the roll and bread dividing and shaping machine shown in FIG. 12; and FIG. 16 is a view of the piston-housing shown in the previous Figures which itself functions as a piston within a separate housing.

DETAILED DESCRIPTION OF THE INVENTION

Referring now to the accompanying Figures wherein like parts are represented by like numerals in the several views, FIGS. 1 to 11 illustrate a preferred embodiment of the variable piston-housing arrangement of the invention indicated generally by the numeral 10. The housing-piston arrangement 10 includes housing 12 which as seen best in FIG. 1 is formed of an outer shell 14 of desired rigid material, such as metal or plastic, having a rectangular cross-section and defining two open internal areas 16,18 each cylindrical in shape and designed to receive a separate piston 20,22, respectively.

As seen in FIGS. 5, 6 and 8, the separate pistons 20 and 22 are disposed within the piston-housing 12, which separate pistons may be formed of rigid material, such as plastic or metal, and may be of any desired number, size, cross-section and arrangement; a preferred separate piston is best shown in FIGS. 9 and 10. Each of the separate pistons 20,22 preferably employed will include an elongated member 24 having a first end 26 adapted to be deployed in the open internal area 16,18 of piston-housing 12, and a second end 28 adapted to be deployed externally to the piston-housing 12. Each of the separate pistons may vary in cross-sectional size, although their length will at least extend the length of its open internal area 16 or 18. The separate pistons may have any cross-sectional shape, but preferably will be of a round, square or rectangular configuration. With such cross-section, each of the pistons may be employed adjacent to and snugly against its respective open internal area of the housing 12 so that they may be made to readily slide past the internal walls of the piston-housing. The first end 26 of each piston will preferably be of flat configuration so as to present a flat end surface to advancing dough. As will be seen, the pistons are disposed in the piston-housing 12 in a manner such that one or more of the pistons may be made to be pushed a predetermined distance out of the piston-housing 12 by advancing dough and thereby leave a vacant space of predetermined size and shape defined by the flat end face 26 of the separate piston and the internal walls of piston-housing 12.

In the separate piston design shown, the second end 28 of each piston extends from the internal open area 16 or 18 of piston-housing 12 and includes transverse-horizontally disposed bore 30 which is adapted to receive return pusher bar 32 shown in FIGS. 5, 6 and 7. The return pusher bar 32 is part of the piston control means mentioned above and includes a bar 34 and roller or wheel 36 mounted thereon as shown. The return pusher bar 32 in part functions to prevent the separate pistons 20,22 from being pushed into the housing to such a degree that the first end portion 26 extends beyond the end of housing 12.

Connected to the piston-housing 12 is a post 40 which includes bore 42 which is employed as part of the piston control means to lock the piston-housing 12 to a roll and bread dividing and shaping machine and thereby prevent movement of the piston-housing 12 and allow for movement of the separate pistons 20,22 therein.

It will now be apparent that the piston control means may be used to fix the position of the piston-housing 12 and allow for movement of the separate pistons 20,22 or, as will be seen hereinafter, unlock the piston-housing 12 and allow for its movement in which case the separate pistons 20,22 will remain fixed in the piston-housing 12 and move along with it as a single unit. Thus, the piston-housing arrangement as shown will be sufficiently versatile so that a single unit may be used in the making of rolls or breads whose size, weight and shape correspond to the area vacated in the open internal areas 16,18 of piston-housing 12 by one, two or more pistons, or whose size, weight and shape correspond to the area vacated by the piston-housing 12 itself in a separate housing as will be seen hereinafter.

The housing-piston arrangement 10 will be employed in conjunction with conventional or standard roll and bread dividing and shaping machines one example of which is shown in FIGS. 12 to 15.

The roll and bread dividing and shaping machine generally referred to by the numeral 80 is designed for forming dough pieces to desired size, shape and roundness and delivers such pieces to a conveyer (not shown) which moves such pieces into an oven (not shown) for baking. Machine 80 will only briefly be described since it is of conventional construction and design and is well known to those skilled in the commercial baking machine art. In fact, the variable housing-piston arrangement 10 of the invention may be employed in place of standard fixed piston-housing arrangements in such conventional roll and bread dividing and shaping machines and is designed in size and shape so that it may be easily adapted for use in such conventional machines.

Referring to FIG. 12, there is shown roll and bread dividing and shaping machine 80 which includes conventional feeder means 82 which includes dough hopper 84 and variable housing-piston arrangement 10 of the invention disposed at the exit 86 of the hopper, and at one end of dough path 87, as shown. Dough pusher piston 88 for pushing dough exiting hopper 84 into the piston-housing 12 or into the separate housing 90 (as described hereinafter), is disposed substantially opposite the housing-piston arrangement 10 and is driven by conventional drive means, as shown, which will also be used to drive piston-housing arrangement 10.

Piston-housing arrangement 10 is seated in separate housing 90 also referred to as back block 90 (of conventional design) which is itself seated between a pair of tracks so that the separate housing or back block 90 carrying piston-housing 12 may be moved up and down tracks 91 and thus into communication with dough path 87 and out of communication therewith by means of conventional drive means. When it is desired to provide dough pieces for rolls or small breads, the piston-housing 12 will be locked in place by means of bolt 70 which passes through bore 42 of post 40 and through bore 72 of casting 74 of the roll and bread dividing and shaping machine frame as best seen in FIG. 13. When it is desired to make dough pieces for breads, the bolt 70 will be removed thereby freeing piston-housing 12 to move within separate housing 90 as shown in FIG. 16. In this case, the separate pistons will be maintained within the piston-housing 12 to provide a solid piston unit.

The roll and bread dividing and shaping machine 80 will also include stationary knife means 92 for cutting sized and scaled dough pieces from remaining dough, which pieces are then conveyed to a baking oven.

As seen in FIGS. 12 and 13, conventional piston control means are provided which will limit the distance that the separate pistons 20,22 or piston-housing 12 may be pushed, by means of advancing dough, out of the piston-housing 12 or separate housing 90, respectively, and thereby limit the size of the area vacated by the pistons which area will conform in size and shape to the size and shape of the rolls and breads to be baked. The piston control means as shown is essentially a back stop plate 94 which will bear against wheel 36 of return pusher bar 32 which is lodged in bores 30 (best shown in FIGS. 5, 6 and 8) of the separate pistons 20,22. An elongated screw 100 (shown in FIGS. 13 and 16) may be used to adjust the position of the back stop plate 94 with respect to the return pusher bar 32 and associated pistons. Thus, as seen in FIG. 13, turning handle 102 of screw 100 so that screw 100 moves inwardly allows the back stop plate 94 to be moved away from the wheel 36 of return pusher bar 32 to thereby allow increased movement of the pistons 20,22 out of the piston-housing 12 (or where bolt 70 is removed from post 40 of the piston-housing 12 to thereby allow increased movement of the piston-housing 12 out of the separate housing 90), and thereby allow an increase in the size and weight of pieces of dough formed in the piston-housing 12 or separate housing 90. Where screw 100 is moved outwardly, the back stop plate 94 is moved closer to the return pusher bar 32 thereby reducing and restricting movement of the separate pistons 20,22 out from the piston-housing 12 or reducing and restricting movement of the piston-housing 12 out from the separate housing 90.

Referring now to FIGS. 14 and 15, there are shown conventional return means for causing the back stop plate 94 to push the separate pistons 20,22 extending from piston-housing 12 or the piston-housing 12 extending from the separate housing 90 back into its respective housing and thereby force sized and scaled dough out from such housing. Inasmuch as such means are of conventional design and construction and are presently used in roll and bread dividing and shaping machines, a detailed description thereof is not believed to be necessary.

The machine 80 also includes connecting rod 110 connected at one end to housing 90 and is connected at the other end via crank shaft-sprocket 112 by drive chain 114 to motor 116. As will be seen, the motor 116-drive chain 114-connecting rod 112 move housing-piston arrangement 10 in an up and down motion past the cutting knife 92.

Connecting rod 120 is connected at one end to crank shaft-sprocket 112 and at the other end to connecting rod 122 which as shown is connected at its other end via arm 124 to piston 88. Thus, it is seen that motor 116 via drive chain 114 and crank shaft-sprocket 112 also drives connecting rod 120 which in turn drives connecting rod 122 which in turn drives piston 88.

Rounding drum 130 (a conventional piece of equipment) employed for rounding off pieces of shaped dough (cut-off from dough in the piston-housing 12 by cutting knife 92) is also driven by motor 116 via drive chain 132. Brush 134 is positioned in close proximity to drum 130 to remove excess dough from drum 130.

Also shown in FIG. 12 is flour duster assembly 140 which sprinkles flour on the drum 130 to aid in separating rounded dough from drum 130. Chute assembly 150 is positioned below cutting knife 92 to guide cut dough pieces on to the drum 130.

Machine 80 also includes motor 160 connected via drive chain 162 to sprocket 164 which in turn is connected to a conveyor (not shown) for moving shaped and rounded pieces of dough to an oven for baking.

The dividing and shaping machine as shown in FIGS. 12 to 16 which includes the preferred variable housing-piston arrangement of the invention as shown in FIGS. 1 to 11 and as described above may be operated as follows.

It will be appreciated that with the piston set up shown in the Figures, rolls and breads of many different sizes, shapes and weight may be formed depending upon whether separate pistons 20,22 or piston-housing 12 are mobilized and which of such pistons are immobilized. Thus, if pistons 20 and 22 are mobilized (by locking piston-housing 12, via bolt 70, in place), two rolls of the size and shape of the space vacated in piston-housing 12 by these pistons 20,22 may be formed at the same time. If desired, the bolt 70 may be removed thereby freeing piston-housing 12 for movement relative to separate housing 90 in which case separate pistons 20 and 22, will remain in the piston-housing 12 and simply move with such housing. In this way, piston-housing 12 and pistons 20,22 will, as a single unit, be mobilized to form yet larger rolls or breads.

Once the housing-piston 12 arrangement has been adjusted, and the position of the back stop plate 94 is adjusted as described above, the baking machine may be activated. Dough will be fed into feeder 82 which includes hopper 84. The dough moves downwardly out of hopper exit 86 into the dough path 87. Dough pusher piston 88 by means of connecting arm 124, connecting rod 122, connecting rod 120, crank shaft-sprocket 112, drive chain 114 and motor 116, pushes the dough against the first end faces 26 of the separate pistons 20,22 or against the end face of the piston-housing 12 depending whether bolt 70 is deployed. At this point in time, the back block or separate housing 90 is in the up position (in its tracks) so that the piston 20,22 end faces 26 (or the end face of the piston-housing 12) abuts the entrance to the dough path 87. The dough pusher piston 88 forces the dough against the end faces of the piston (or piston-housing 12); the dough pushes the mobilized pistons 20,22 (or piston-housing 12) back out of its respective internal area 16,18 or housing thereby leaving a vacated space or area which area is thus occupied by dough. The back block or separate housing 90 is then made by means of connecting rod 110, crank shaft-sprocket 112, drive chain 114 and motor 116, to move downwardly in its tracks carrying the housing-piston arrangement 10 away from the dough path 87 and thereby shutting off such dough path, while knife 92 cuts off the dough in the piston-housing 12 from the dough in the dough path 87. At this point, dough pusher piston 88 has moved away from piston-housing 12 and has returned to its rest position. As the housing-piston arrangement is moved downwardly, the return pusher bar 32 is forced, by means of back stop plate 94, against the previously withdrawn pistons 20,22 (or piston-housing 12 as a unit with pistons 20,22) employing conventional return apparatus as shown in FIGS. 14 and 15. As the pistons are pushed back into their respective housing 16,18, they force the sized and scaled dough out from such housing 16,18 and the sized and scaled pieces of dough are collected and conveyed to a conventional oven (not shown for drawing clarity) to be baked into rolls or breads.

The piston-housing arrangement is then moved upwardly via back block or separate housing 90 whereby back stop plate 94 is removed away from the pistons by the return apparatus of FIGS. 14 and 15 and the piston-housing 12 is moved so that it is in communication with the dough path 87; dough pusher piston 88 forces a new supply of dough against the piston-housing 12 forcing the mobilized pistons 20,22 to be pushed out of the piston-housing 12 (or, if bolt 70 is not deployed, forcing the piston-housing 12 and pistons 20,22 as a single unit out of the separate housing 90) to leave a vacated area of predetermined size and shape and the entire process as described above is again repeated.

As indicated, the design, construction and operation of the return apparatus shown in FIGS. 14 and 15 and FIG. 12 does not form any part of the invention and is known in the art and is only supplied for purposes of illustration. Furthermore, any number of separate pistons may be used in conjunction with the piston-housing 12.

What is claimed is:

1. A variable housing-piston arrangement especially adapted for use in conjunction with a roll and bread dividing and shaping machine comprising, in combination, a piston-housing including an open internal area adapted to receive baking dough, said piston-housing itself being adapted to function as a piston within a separate open internal area of a separate housing adapted to receive dough, and said piston-housing being adapted to receive at least one separate and independently operable piston within said open internal area of said piston-housing;

at least one separate piston disposed in said open internal area of said piston-housing, said separate piston being adapted to be fixed in position within said piston-housing or be made to move, independently of said piston-housing, within said internal area of said piston-housing, and piston control means for independently controlling operation and movement of said separate piston within said internal area of said piston-housing, and controlling movement of said piston-housing itself, whereby fixing the position of said piston-housing and withdrawal of a portion of said separate pistons, by means of said piston control means and dough entering said internal area of said piston-housing, a predetermined distance out from said internal area of said piston-housing leaves a predetermined vacated area in said piston-housing for received baking dough, which area conforms in size and shape to the desired size and shape of the roll or bread to be baked, and withdrawal of said piston-housing and said separate piston as a single unit from said separate open internal area of said separate housing, by means of said piston control means, leaves a predetermined vacated area in said separate housing for receiving baking dough which area conforms in size and shape to the desired size and shape of the roll or bread to be baked.

2. The arrangement as defined in claim 1 wherein said at least one separate piston comprises at least two separate pistons disposed in said open internal area of said piston-housing.

3. The arrangement as defined in claim 1 wherein said separate pistons are adapted to be pushed out of said open internal area of said piston-housing a predetermined variable distance by baking dough being forced into the open internal area of said piston-housing.

4. The arrangement as defined in claim 1 wherein when said piston-housing is freed for movement by said piston control means, said separate pistons remain in said open internal area of said piston-housing, and said piston-housing is adapted to be moved, by advancing dough, a predetermined distance out of said separate open internal area of said separate housing.

5. The arrangement as defined in claim 2 wherein each of said separate pistons is comprised of an elongated member having a first end which is adapted to be deployed in said open internal area of said piston-housing and a second end which is adapted to be deployed externally of said piston-housing.

6. The arrangement as defined in claim 5 wherein said separate pistons includes at least one pair of pistons, one disposed along side but spaced from the other.

7. The arrangement as defined in claim 5 wherein said piston control means is in communication with said piston-housing and is adapted to fix the position of said piston-housing and is also in communication with the second end of each of said separate pistons for limiting the actual distance that a portion of each of said separate pistons may be pushed out of said internal area of said piston-housing thereby providing a corresponding vacated area in said housing for receiving baking dough, said vacated area being defined by walls of said separate pistons and interior walls of said piston-housing and corresponding to the size and shape of rolls or bread to be baked.

8. The arrangement as defined in claim 7 wherein said piston control means is comprised of selectively controllable locking means for fixing the position of said piston-housing so that said piston-housing cannot be moved.

9. The arrangement as defined in claim 2 wherein each of the separate pistons are housed in separate open internal areas within the piston-housing.

10. A machine for sizing, shaping and forming rolls and bread which includes a housing piston arrangement as defined in claim 1.

11. The machine as defined in claim 10 including dough feeder means;

said housing-piston arrangement in communication with said dough feeder means so that said dough feeder means may feed dough into said open internal area of said piston-housing and thereby cause one or more of said separate pistons to be pushed out from said piston-housing to leave a vacated space conforming to the size and shape of the roll or bread to be baked;

a separate housing including a separate open internal area in communication with said piston-housing, said piston-housing, when not fixed in position, being adapted to function as a piston and slide within and be pushed out from said separate housing to leave a vacated space confirming to the size and shape of the roll or bread to be baked which vacated space is in communication with said dough feeder means;

piston control means for controlling and limiting the distance that said separate pistons or said piston-housing may be moved by the advancing dough;

knife means to cut dough seated in said piston-housing or said separate housing from the remaining dough; and means for forcing said separate piston back into said piston-housing or for forcing said piston-housing back into said separate housing, thereby pushing sized and shaped dough out from said piston-housing or separate housing.

12. The machine as defined in claim 11 wherein said at least one or more separate pistons comprises a pair of spaced apart pistons.

13. The machine as defined in claim 12 wherein said piston control means includes selective locking means for locking said piston-housing in place thereby allowing said separate pistons to move within said open internal areas of said piston-housing.

14. The machine as defined in claim 13 wherein said piston control means further includes a return pusher bar connected to said separate pistons, a back stop plate which is adapted to bear against said return pusher bar, and return means for causing the back stop plate to push the separate pistons back into said piston-housing or push the piston-housing back into said separate housing, and thereby force sized and scaled dough out from the housing.

15. The machine as defined in claim 14 wherein said back stop plate is adjustable in position and thereby can fix the predetermined distance which the separate pistons may be withdrawn from said piston-housing when the piston-housing is in a fixed position or the predetermined distance which the piston-housing may be withdrawn from said separate housing when said piston-housing is allowed to move relative to said separate housing.

16. The machine as defined in claim 13 wherein when the piston control means is actuated to lock the piston-housing in place, the separate pistons function to form dough pieces for rolls and when the piston control means is actuated to unlock the piston-housing so that is may move relative to said separate housing while said separate pistons remain in said piston-housing, the piston-housing functions to form dough pieces for bread.

* * * * *